(12) United States Patent
Hirano

(10) Patent No.: US 9,373,067 B2
(45) Date of Patent: Jun. 21, 2016

(54) IMAGE FORMING APPARATUS AND METHOD FOR CONTROLLING THE SAME

(71) Applicant: CANON KABUSHIKI KAISHA, Tokyo (JP)

(72) Inventor: Yasuhiko Hirano, Moriya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/924,530

(22) Filed: Oct. 27, 2015

(65) Prior Publication Data

US 2016/0125279 A1    May 5, 2016

(30) Foreign Application Priority Data

Oct. 31, 2014   (JP) ................................. 2014-222649

(51) Int. Cl.
*G03G 15/00*   (2006.01)
*G06K 15/00*   (2006.01)
*G06K 15/12*   (2006.01)

(52) U.S. Cl.
CPC .............. *G06K 15/407* (2013.01); *G03G 15/50* (2013.01); *G06K 15/129* (2013.01); *G06K 15/1228* (2013.01)

(58) Field of Classification Search
CPC . G03G 15/01; G03G 15/043; G03G 15/5025; G03G 15/5058; G03G 15/224; G03G 15/502; G03G 15/5041; G03G 15/5054
See application file for complete search history.

(56) References Cited

U.S. PATENT DOCUMENTS

| | | | |
|---|---|---|---|
| 8,988,730 B2* | 3/2015 | Tsutsumi | H04N 1/6022 347/16 |
| 2008/0159766 A1* | 7/2008 | Tanaka | G03G 21/043 399/74 |

FOREIGN PATENT DOCUMENTS

JP    2007-272153 A    10/2007

* cited by examiner

*Primary Examiner* — Roy Y Yi
(74) *Attorney, Agent, or Firm* — Canon U.S.A., Inc. IP Division

(57) ABSTRACT

An image forming method according to the present invention includes obtaining a number of pixels in a sub-scanning direction of a white region in image data, the white region being adjacent to a region at a downstream side in the sub-scanning direction of the region and the region being in the image data and including, continuously in the sub-scanning direction, pixels with a density not smaller than a predetermined density, and correcting a pixel value for a unit region based on the number of pixels of the white region obtained by the obtaining so that a density of the unit region becomes low, the unit region being included in the region at the downstream side thereof in the sub-scanning direction.

19 Claims, 12 Drawing Sheets

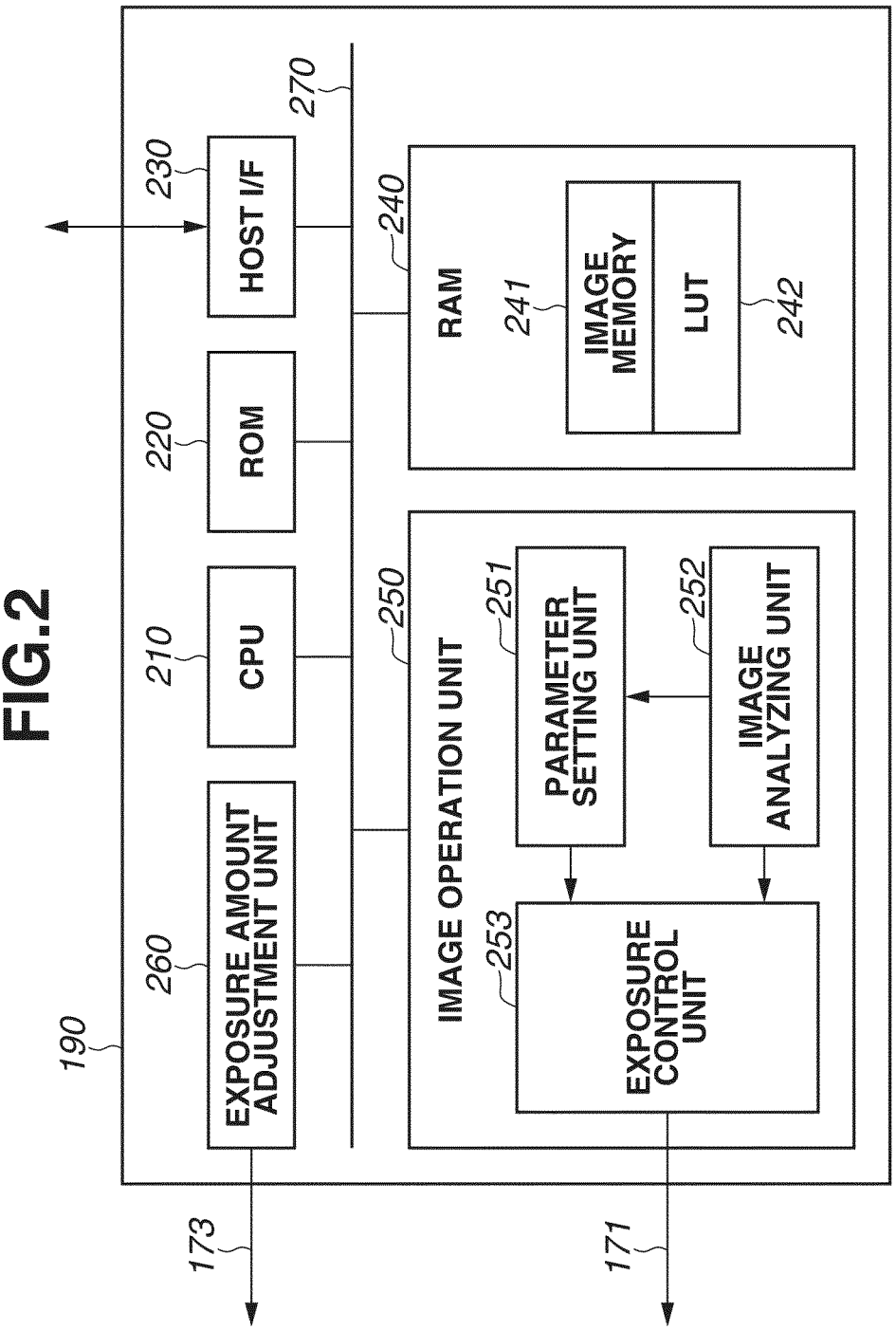

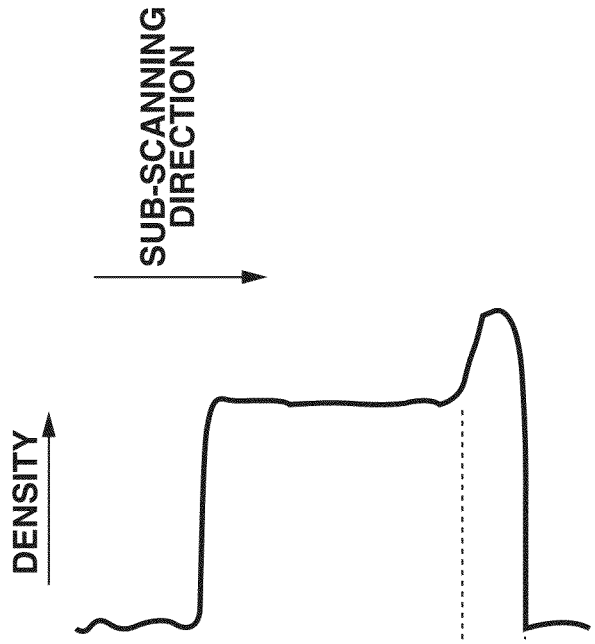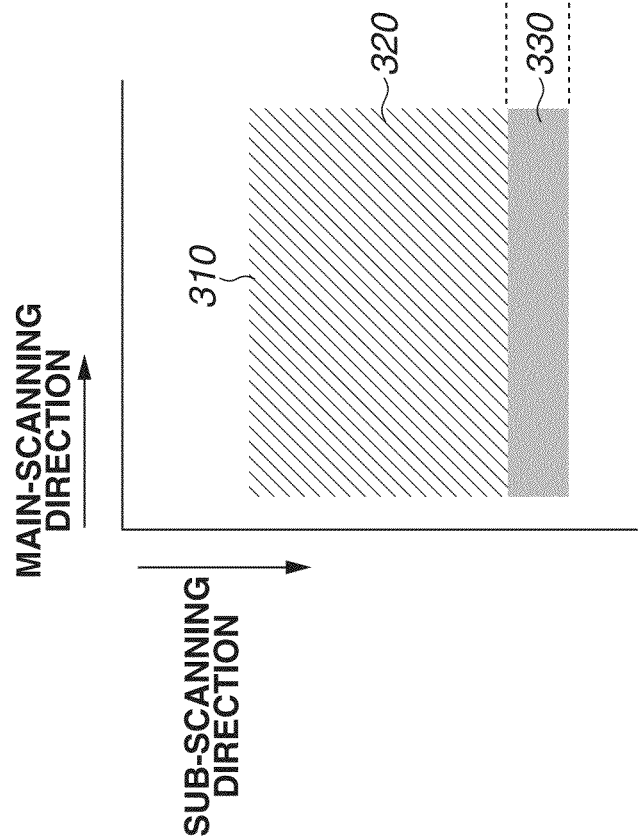

TIME

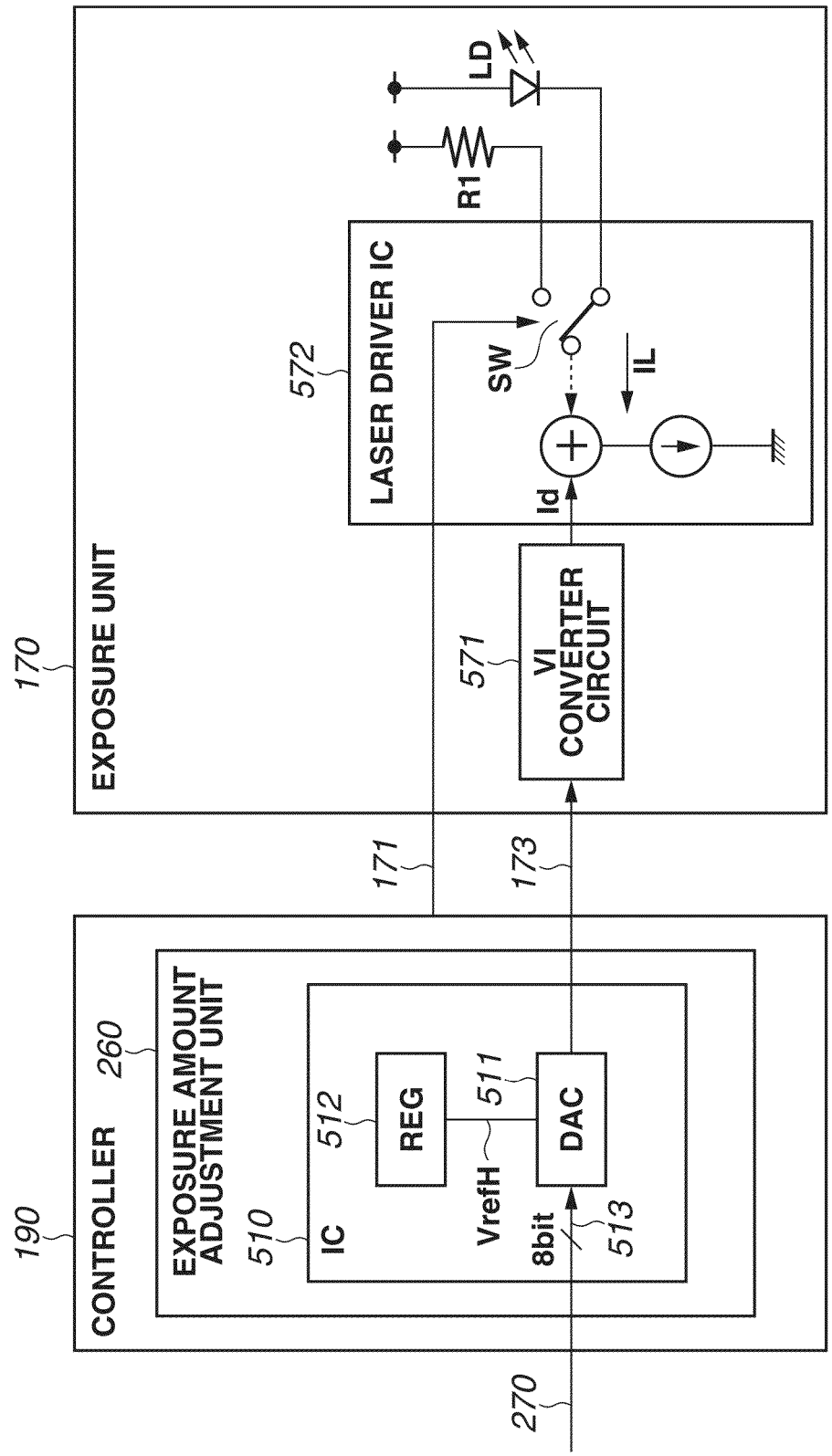

TIME

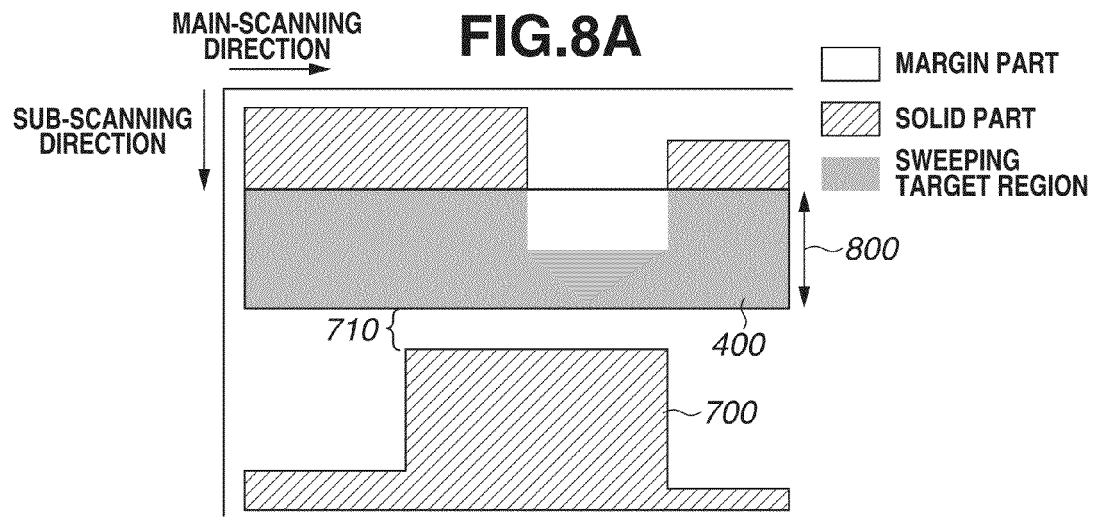
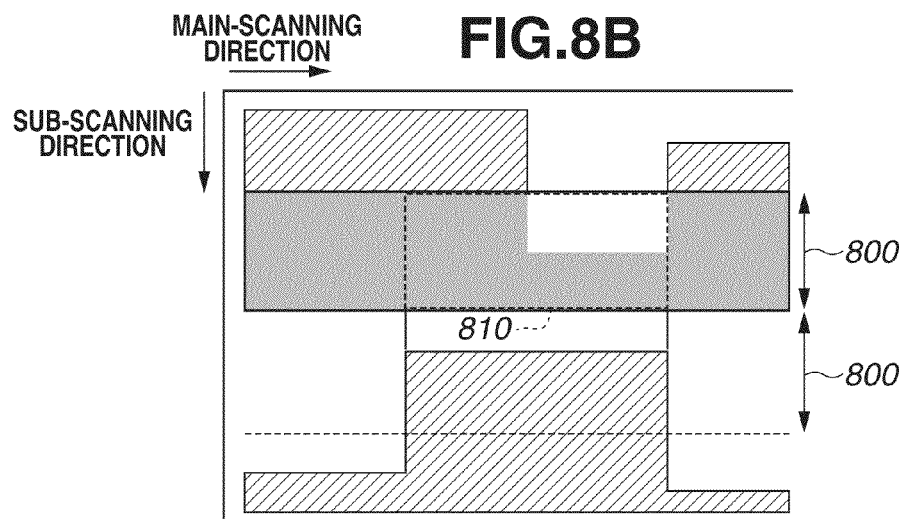
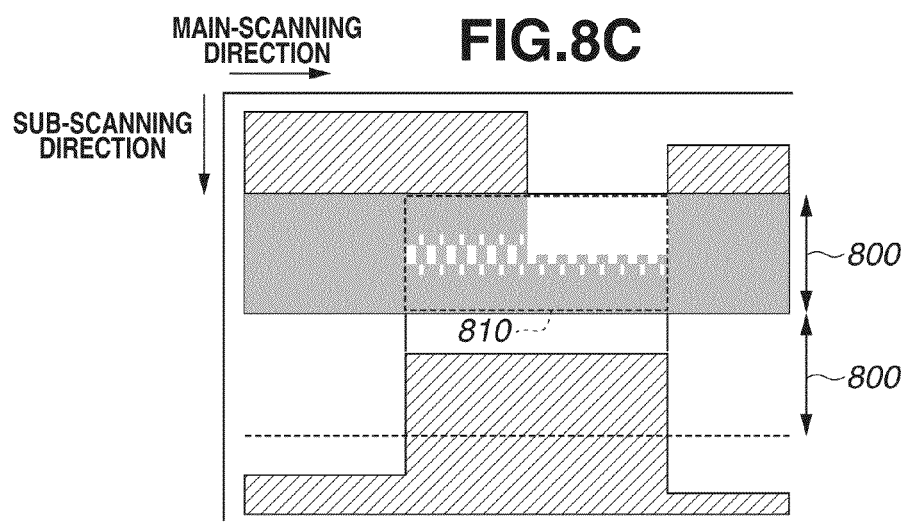

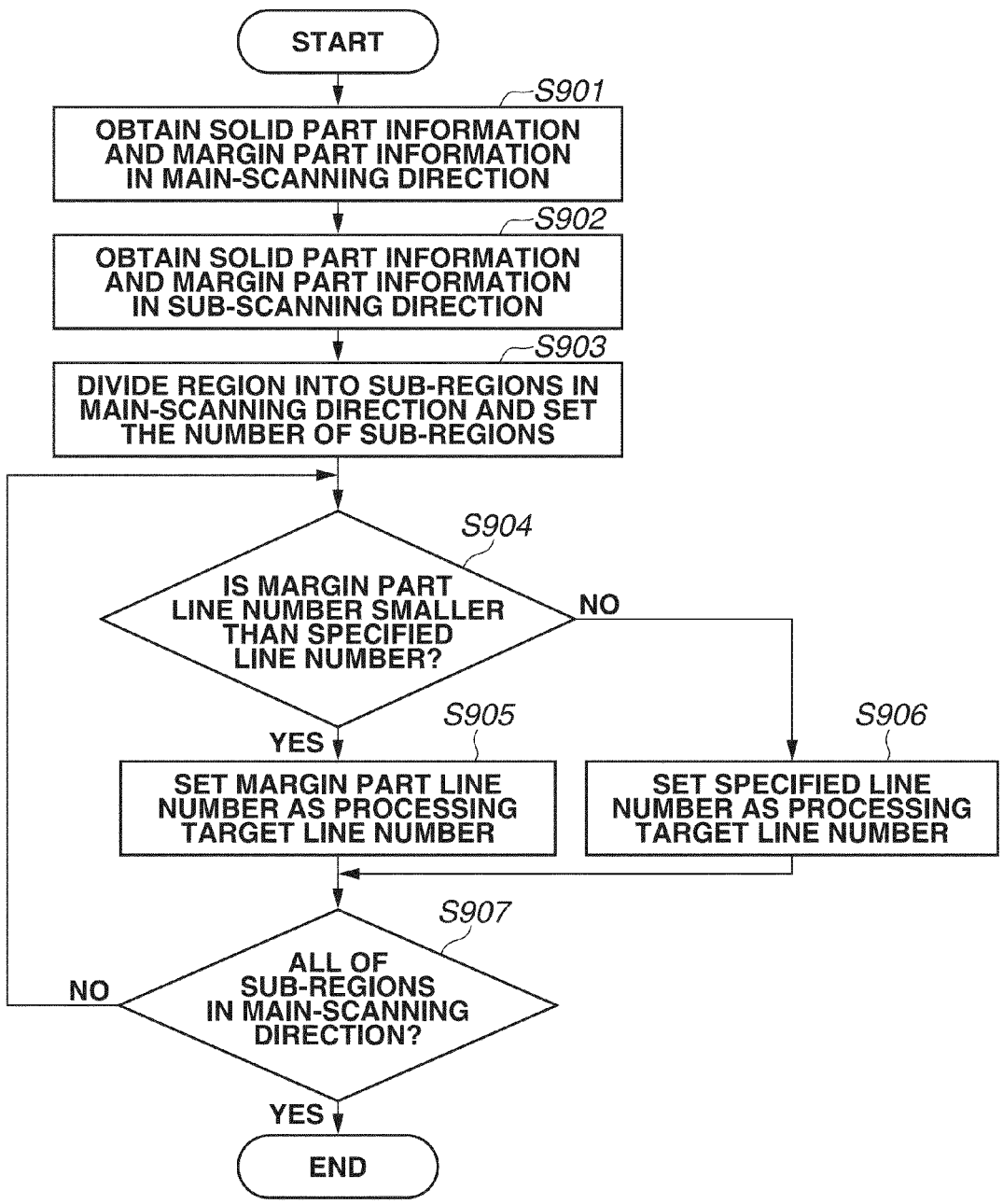

IMAGE FORMING APPARATUS AND METHOD FOR CONTROLLING THE SAME

BACKGROUND OF THE INVENTION

1. Field of the Invention

The present invention relates to an image forming apparatus that can reduce consumption of coloring materials to be used and to a method for controlling the image forming apparatus.

2. Description of the Related Art

In an electrophotographic-type image forming apparatus, a latent image part is formed on a photosensitive drum by exposure and the photosensitive drum is brought into contact with a developing roller with toner thereon so that the toner is transferred to the latent image part from the developing roller and a toner image is formed on the photosensitive drum. In this toner image formation, a phenomenon called "sweeping" is observed. The "sweeping" is a phenomenon where a difference in the rate of rotation between a photosensitive drum and a developing roller makes toner be transferred to a rear end part of a latent image part on the photosensitive drum in a rotational direction in an amount larger than to the other portions of the latent image part. In other words, the "sweeping" leaves excess toner on the rear end part of the latent image part.

A technique for preventing toner from being excessively transferred due to the "sweeping" is discussed in Japanese Patent Application Laid-Open No. 2007-272153. Japanese Patent Application Laid-Open No. 2007-272153 discusses making correction by changing density in a region where sweeping is to take place (hereinafter referred to as "sweeping target region"), according to a correction table determined in advance, based on a difference in density between in the sweeping target region and in a region located parallel to the sweeping target region in a sub-scanning direction.

SUMMARY OF THE INVENTION

Japanese Patent Application Laid-Open No. 2007-272153, however, does not take into account the size of a margin part following the sweeping target region in the sub-scanning direction (that is, the number of lines of the margin part in the sub-scanning direction). Therefore, the correction to remove the sweeping sometimes ends up by being excessive depending on the number of lines of the margin part, and the excessive correction can cause deterioration in image quality such as generation of solid-white.

According to an aspect of the present invention, an image forming apparatus includes an obtaining unit configured to obtain a number of pixels in a sub-scanning direction of a white region in image data, the white region being adjacent to a region at a downstream side in the sub-scanning direction of the region and the region being in the image data and including, continuously in the sub-scanning direction, pixels with a density not smaller than a predetermined density, and a correcting unit configured to correct a pixel value for a unit region based on the number of pixels of the white region obtained by the obtaining unit so that a density of the unit region becomes low, the unit region being included in the region at the downstream side thereof in the sub-scanning direction, wherein the correction unit corrects the density of the unit region with a first correction amount in a case where the number of pixels of the white region obtained by the obtaining unit is a first number of pixels, and corrects the density of the unit region with a second correction amount larger than the first correction amount in a case where the number of pixels of the white region obtained by the obtaining unit is a second number of pixels which is larger than the first number of pixels.

With the present invention, it becomes possible to prevent excessive supply of toner resulting from the sweeping and to avoid deterioration in image quality such as generation of solid-white.

Further features of the present invention will become apparent from the following description of exemplary embodiments with reference to the attached drawings.

BRIEF DESCRIPTION OF THE DRAWINGS

FIG. 2 is a block diagram illustrating a configuration of a controller according to an exemplary embodiment.

FIGS. 3A and 3B are diagrams illustrating density of toner when sweeping occurs.

FIG. 5 is a diagram illustrating a function part related to exposure in an exposure unit according to an exemplary embodiment.

FIGS. 8A to 8C are diagrams illustrating an example of void generation that occurs in a case where sweeping is corrected when a margin part is small in area.

FIG. 9 is a flowchart representing processes for determining a sweeping correction processing target line in a first exemplary embodiment.

DESCRIPTION OF THE EMBODIMENTS

Exemplary embodiments for implementing the present invention will be hereinafter described with reference to accompanying drawings. The general outline and configuration of an image forming apparatus will be described first. Next, descriptions will be made of a phenomenon of sweeping and the necessity of considering a margin part in removing sweeping, the margin part following a sweeping target region. The processing with a margin part taken into account in the exemplary embodiments will be thereafter described.

<<General Outline of Image Forming Apparatus>>

Figure 1:
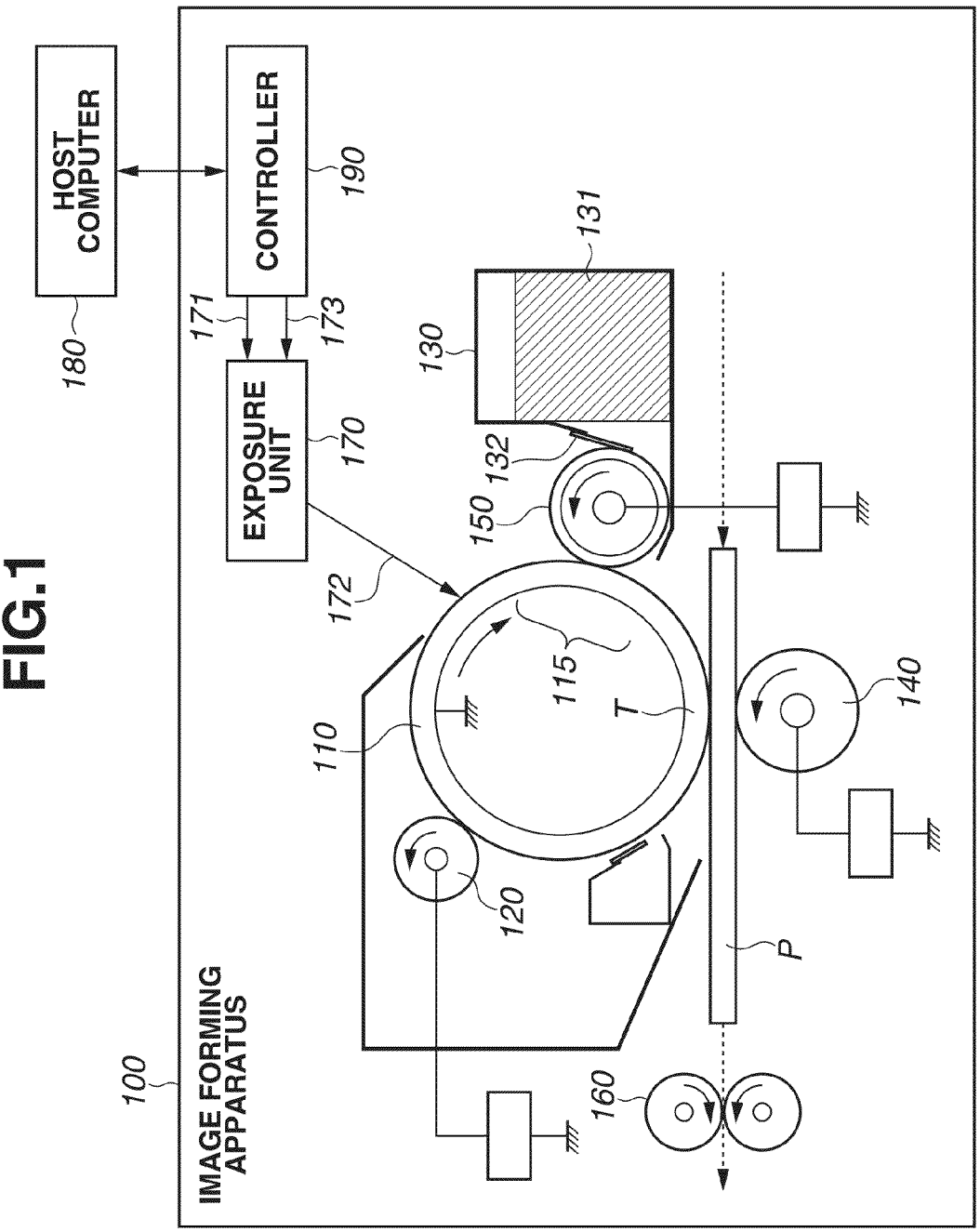
FIG. 1 is a schematic diagram illustrating an image forming apparatus according to an exemplary embodiment.

A first exemplary embodiment will be described below. The general outline of an image forming apparatus 100 will be described first with reference to FIG. 1. FIG. 1 is a block diagram illustrating a general configuration of the image forming apparatus 100. The image forming apparatus 100 has a drum-shaped electrophotographic photosensitive (hereinafter referred to as the "photosensitive drum") 110 as an image bearing member, a charging part 120, a developing part 130, a transfer part 140, a developing roller 150, a fixing part 160, an exposure unit 170, and a controller 190. The exposure unit 170 includes a laser beam scanner and a surface emitting element, for example. The controller 190 controls the entirety of the image forming apparatus 100. The controller 190 outputs a driving signal 171 and a light amount adjustment signal 173 to the exposure unit 170. The exposure unit 170 irradiates the photosensitive drum 110 with laser beam 172 to perform exposure. The developing part 130 has a developing agent (hereinafter referred to as the "toner") 131 and a regulating blade 132. The image forming apparatus 100 is connected to a host computer 180 so that it can exchange image data and various types of control information with the host computer 180.

In FIG. 1, a developing region 115 where toner is transferred from the developing roller 150 to the photosensitive drum 110 is illustrated. Further, in FIG. 1, P represents a transfer material and T represents a transfer position at which a toner image is transferred to the transfer material P.

The charging part 120 such as a charging roller or the like charges a surface of the photosensitive drum 110 in a uniform manner. The exposure unit 170 irradiates the photosensitive drum 110 having been uniformly-charged with the laser beam 172 in an exposure amount determined based on image data to expose the exposure unit 170. The exposure is thus carried out with the laser beam. The exposure allows formation of an electrostatic latent image on the surface of the photosensitive drum 110. The exposure unit 170 receives the driving signal 171 output from the controller 190, and applies the laser beam 172 to the photosensitive drum 110 according to the driving signal 171 so that an electrostatic latent image is formed thereon.

The controller 190 outputs, to the exposure unit 170, the light amount adjustment signal 173 to adjust a desired light amount at exposure. In this way, a specific amount of current is supplied to the exposure unit 170 and the intensity of exposure is controlled to be maintained at a fixed level. Based on the desired light amount serving as a reference, the light amount is adjusted for each pixel and the time for light emission is adjusted by pulse width modulation. This realizes gradation display of an image.

FIG. 2 is a block diagram illustrating an example of the configuration of the controller 190. The controller 190 has a central processing unit (CPU) 210, a read only memory (ROM) 220, a host interface (I/F) 230, a random access memory (RAM) 240, an image operation unit 250, an exposure amount adjustment unit 260, and a system bus 270. The RAM 240 includes a region storing an image memory 241 and a look-up table (LUT) 242. The image operation unit 250 has a parameter setting unit 251, an image analyzing unit 252, and an exposure control unit 253.

The CPU 210 controls components of the controller 190. The ROM 220 stores a control program of the controller 190. The host I/F 230 controls an interface with the host computer 180. The RAM 240 serves as regions for executing the control program of the controller 190, for work data for image processing, and for storing data. The image memory 241 stores image data. The LUT 242 is a look-up table storing correction values of the exposure amount for reducing sweeping.

The processing in the controller 190 is executed by the CPU 210 according to a program stored in the ROM 220 or loaded into the RAM 240. The controller 190 executes correction processing for reducing consumption of toner according to a parameter stored in the LUT 242, which is a correction width parameter corresponding to the number of lines of a region to be swept and an exposure correction parameter indicating an exposure correction amount for removing sweeping.

In the exemplary embodiment, reduction of the toner consumption is achieved by suppressing excessive adhesion of toner caused by "sweeping". This will be described in detail below.

The controller 190 receives raster data (image data) sent from an image scanner or the host computer 180, and executes correction processing to reduce the toner consumption. The "sweeping" herein means a phenomenon where an excessively large amount of toner is transferred to a rear end part, in a conveyance direction, of an electrostatic latent image, as described above. The excessive transfer of toner leads not only to lower reproducibility of density of an image with respect to the density of a manuscript but also to excessive toner consumption. Hence, suppressing excessive toner consumption brings reduction in toner consumption.

The image operation unit 250 specifies, from among pixels constituting image data, pixels of a region where sweeping of toner can generate, and determines an exposure correction parameter to be used for exposing the region to thereby cause the exposure unit 170 to perform exposure using the determined exposure correction parameter. That is, the image analyzing unit 252 in the image operation unit 250 analyzes the image data. The image analyzing unit 252 then divides a region to be subjected to sweeping correction into a plurality of sub-regions and determines, for each sub-region, the number of lines on which sweeping correction is to be performed. The parameter setting unit 251 in the image operation unit 250 sets, based on the LUT 242, an exposure correction parameter corresponding to the number of lines determined in the image analyzing unit 252. The exposure control unit 253 corrects the exposure amount for each sub-region, using the exposure correction parameter set to correspond to the number of lines. The correction enables decrease in occurrence of toner sweeping as well as prevention of solid-white generation, as will be described below in detail. It is to be noted that a region where sweeping of toner can occur will be referred to as the "sweeping target region". The image operation unit 250 performs processing according to a program executed by the CPU 210, for example. This will be described below.

The exposure amount adjustment unit 260 sets a desired light amount by executing automatic light amount control (APC) on a light source of the exposure unit 170.

The LUT 242 associates the number of lines of a sweeping target region with an exposure correction parameter indicative of an exposure correction amount corresponding to the number of lines in correcting sweeping, and stores them.

The developer 130 has a toner container for storing and preserving the toner 131 and the developing roller 150 serving as a developing agent bearing member. While the toner 131 is non-magnetic toner in the exemplary embodiment, it may be either binary toner or magnetic toner. The thickness of layer of the toner 131 supplied to the developing roller 150 is regulated by the regulating blade 132 functioning as a toner layer thickness regulator. The regulating blade 132 may be configured to provide charges to the toner 131.

The toner 131, which is regulated to have a predetermined thickness and is provided with a predetermined amount of charges, is conveyed to the developing region 115 by the developing roller 150. The developing region 115 is an area where the developing roller 150 and the photosensitive drum 110 are close to or in contact with each other and is also an area where the toner is transferred to an electrostatic latent image on the photosensitive drum 110. An electrostatic latent image formed on the surface of the photosensitive drum 110 is developed using the toner 131 and is converted into a toner image. Moreover, the toner image formed on the surface of the photosensitive drum 110 is transferred onto the transfer material P by the transfer part 140 at the transfer position T. The toner image transferred onto the transfer material P is conveyed to the fixing part 160. The fixing part 160 applies heat and pressure to the toner image and the transfer material P to fix the toner image on the transfer material P.

<<Contact Development Method>>

Next there will be described a contact development method to be applied to the developing region 115 between the photosensitive drum 110 and the developing roller 150. A contact development method is used to perform development, using the toner 131 in the developing region 115, by applying a developing voltage (direct-current bias) to an area between the developing roller 150 and the photosensitive drum 110 in contact with each other, the photosensitive drum 110 and the developing roller 150 being the closest to each other in the developing region 115.

Furthermore, the developing voltage (direct-current voltage), which is applied to the area between the photosensitive drum 110 and the developing roller 150, has a polarity set to be the same as that of the charged potential of the surface of the photosensitive drum 110. The toner 131 is formed into a thin layer on the developing roller 150 and is conveyed to the developing region 115, and the electrostatic latent image on the surface of the photosensitive drum 110 is developed.

<<Principle of Generation of Sweeping>>

Subsequently, "sweeping" generated when the contact development method is used will be described with reference to FIGS. 3A and 3B and FIGS. 4A to 4B. FIGS. 3A and 3B is a diagram illustrating a phenomenon caused by sweeping. The photosensitive drum 110 and the developing roller 150 rotate at different circumferential speeds in the same direction. The sweeping is a phenomenon where the difference in the circumferential speed causes excessive concentration of the toner 131 on the rear end part of an image in a sub-scanning direction (the rotational direction of the photosensitive drum 110), as illustrated in FIG. 3A. The rear end part herein indicates the rear end part of the toner image in the conveyance direction (the rotational direction of the photosensitive drum 110), which is the rear end part in a sub-scanning direction on a paper. The term "image" used in the description of FIGS. 3A and 3B means individual image objects, not the entire image transferred onto the transfer material P. In the phenomenon of sweeping that occurs when there are several horizontal lines of black letters (solid portions) in a sub-scanning direction, for example, the rear end part of each letter corresponds to the rear end part of the image described above.

When sweeping generates, the density of a rear-end edge part 330 of the toner image 310 becomes larger than that of a non-edge part 320 and the consumption of the toner 131 is increased, as illustrated in FIG. 3B.

Figure 4A:
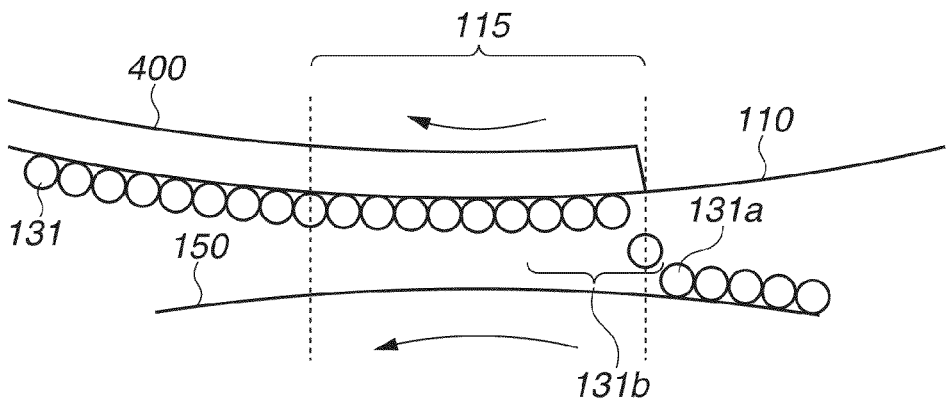
FIGS. 4A to 4C are diagrams illustrating a mechanism of sweeping.
Figure 4B:
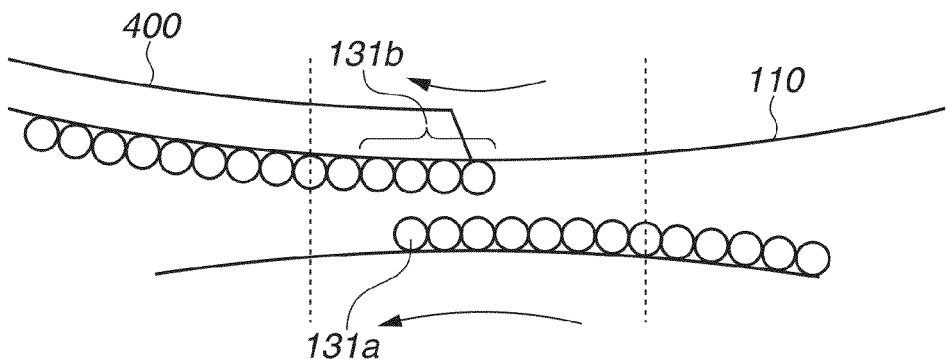
Figure 4C:
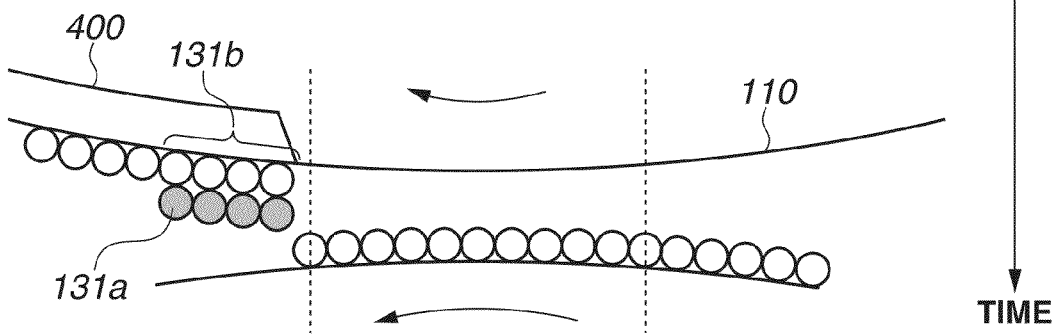

FIGS. 4A to 4C are diagrams for illustrating the principle of generation of sweeping. In the contact development method, the circumferential speed of the developing roller 150 is made higher than that of the photosensitive drum 110 as shown by the lengths of the arrows in FIGS. 4A to 4C so that the height of toner on the photosensitive drum 110 is set to be a predetermined value. This makes it possible to provide stable supply of toner 131 to the photosensitive drum 110, thereby allowing the image density to be maintained at a target value.

As illustrated in FIG. 4A, an electrostatic latent image is developed in the developing region 115 using the toner 131 conveyed by the developing roller 150. More specifically, the toner 131 adhering to the developing roller 150 is supplied to the electrostatic latent image on the photosensitive drum 110 in the developing region 115. Since the developing roller 150 rotates faster than the photosensitive drum 110 as described above, the positional relationship between the surface of the developing roller 150 and the surface of the photosensitive drum 110 varies constantly. When the rear end part of an electrostatic latent image 400 enters the developing region 115, toner 131a on the developing roller 150 is located behind a rear end part 131b of the electrostatic latent image 400 with respect to a starting position of the developing region 115 in the rotational direction, as illustrated in FIG. 4A.

Thereafter, the toner 131a on the developing roller 150 gets ahead of the rear end part 131b of the electrostatic latent image 400 by the time when the rear end part 131b of the electrostatic latent image 400 moves out of the developing region 115, as illustrated in FIG. 4B. Subsequently, the toner 131a on the developing roller 150 is supplied to the rear end part 131b of the electrostatic latent image 400 as illustrated in FIG. 4C, and the development amount at the rear end part 131b is increased accordingly. This is the mechanism of sweeping.

<<Method for Controlling Exposure Device>>

Next, a method for controlling the exposure unit 170 will be described with reference to FIG. 5. The exposure amount adjustment unit 260 has an IC 510 containing an 8-bit digital-to-analog (DA) converter 511 and a regulator 512, and generates and transmits a signal controlling the exposure unit 170. The exposure unit 170 is equipped with a voltage-to-Current (VI) conversion circuit 571 that converts a voltage into a current, a laser driver integrated circuit (IC) 572, and a semiconductor laser LD.

The IC 510 adjusts a voltage VrefH, which is output from the regulator 512 based on a basic signal of a light amount adjustment signal. The light amount adjustment signal is a signal indicating a driving current of the semiconductor laser LD sent via the system bus 270 and set by the CPU 210 in the controller 190. The voltage VrefH serves as a reference voltage of the DA converter 511. The DA converter 511 outputs the light amount adjustment signal 173 in such a manner that the IC 510 sets input data 513 of the DA converter 511. The VI conversion circuit 571 converts the light amount adjustment signal 173 into a current value Id and outputs the current value Id to the laser driver IC 572.

In FIG. 5, the IC 510 built in the exposure amount adjustment unit 260 outputs the light amount adjustment signal 173. The case however is not limited to this configuration and it is possible that the DA converter 511 may be installed on the exposure unit 170 and the light amount adjustment signal 173 may be generated near the laser driver IC 572. The laser driver IC 572 changes a switch SW based on the driving signal 171 output from the image operation unit 250 in the controller 190. The switch SW controls ON/OFF of emission of the semiconductor laser LD in such a manner as to cause the current IL to be switched to flow in the semiconductor laser LD or to be switched to flow in a dummy resistance R1.

<<Method for Correcting Exposure Amount>>

Subsequently, correction of the exposure amount will be described with reference to FIG. 6. Correcting the exposure amount can be realized by performing pulse-width modulation (PWM) on the driving signal 171. This correction is possible by dividing 1 pixel into 16 sub-pixels and driving the semiconductor laser LD so as to perform exposure exclusively on the odd-numbered ones of the 16 sub-pixels, for example.

Figure 6:
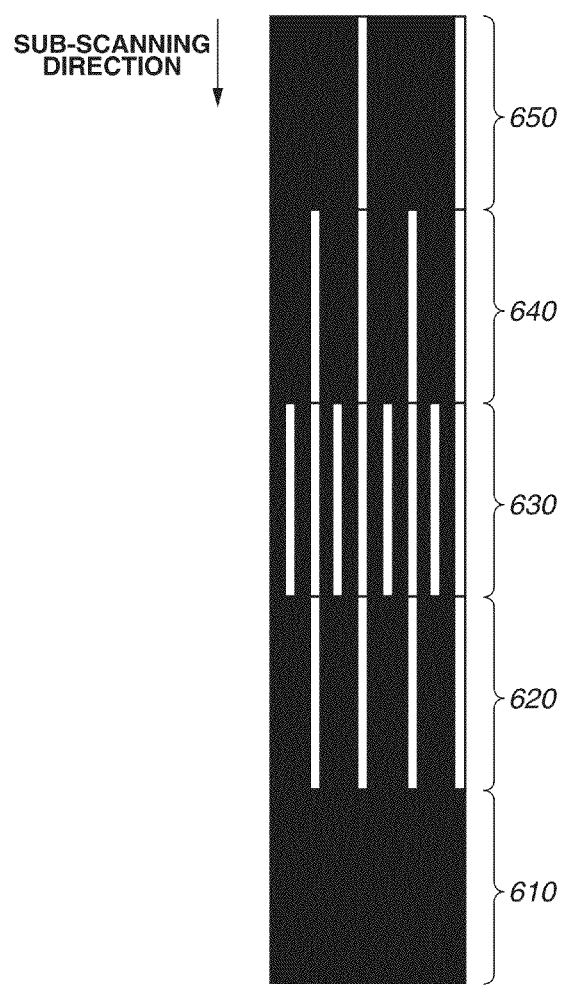
FIG. 6 is a diagram illustrating an example of a pulse-width modulation driving signal.

FIG. 6 uses black color to define the exposure part, where the toner is supplied. The white parts represent regions which are not subjected to exposure and are not provided with the toner. In FIG. 6, a pixel 610 shows a case where no division is made on 1 pixel. In other words, the pixel 610 shows a case where the entirety of 1 pixel is subjected to exposure. A pixel 620 and a pixel 640 show a case where 1 pixel is divided into 16 sub-pixels. In that case, the parts (shown in white) corresponding to 4 sub-pixels out of the 16 sub-pixels (four-sixteenths) are not subjected to exposure and are not provided with the toner. The other 12 sub-pixels (shown in black) are subjected to exposure and the toner is transferred thereto. A pixel 630 shows a case where 1 pixel is divided into 8 sub-pixels and a pixel 650 shows a case where 1 pixel is divided into 2 sub-pixels.

In the exemplary embodiment, sweeping correction is performed in such a manner that the number of divisions of a pixel is adjusted, that is, a manner that the amount of exposure performed on 1 pixel is corrected, so as to correspond to change in density of the rear-end edge part 330 in the sub-scanning direction in FIGS. 3A and 3B. The sweeping correction will be described in detail below.

<<Problem Arising from Sweeping Correction in Margin Part>>

Figure 7A:
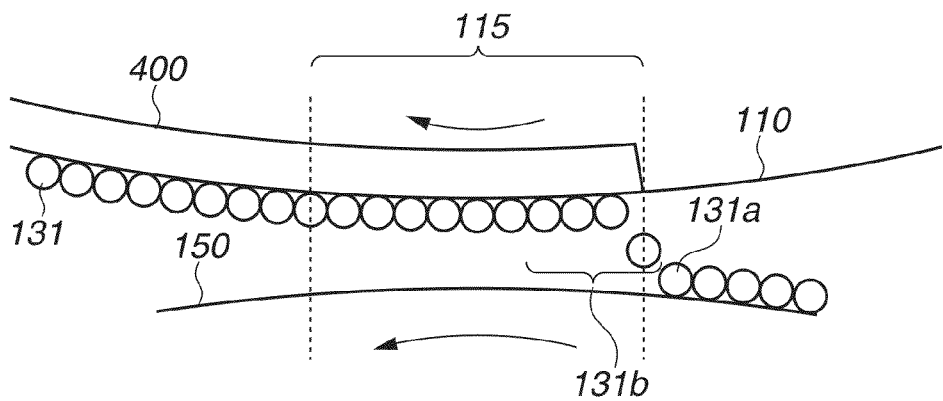
FIGS. 7A to 7C are diagrams illustrating a mechanism of sweeping generated when a margin part is small in area.
Figure 7B:
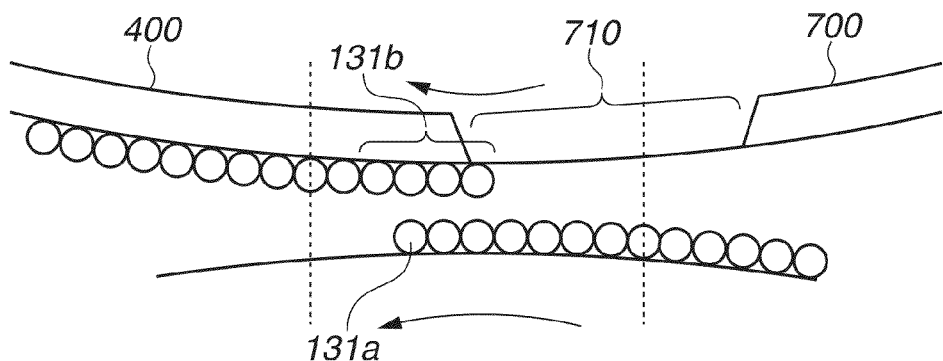
Figure 7C:
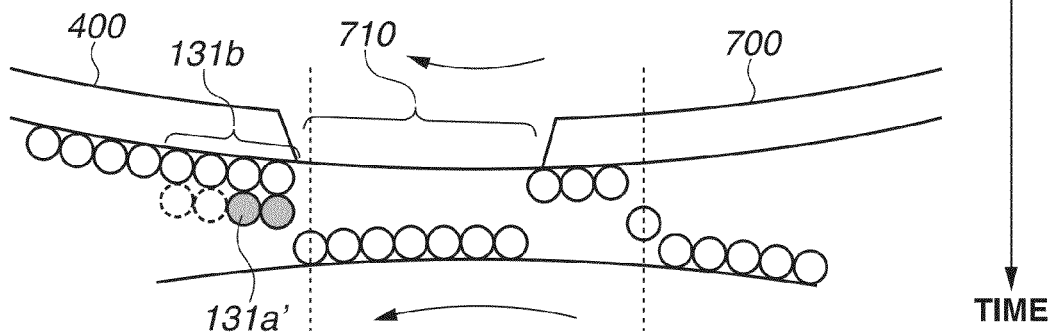

Further, a problem arising from the sweeping correction in a margin part following an edge rear part will be described with reference to FIGS. 7A to 7C and 8A to 8C. FIGS. 7A to 7C describe how a sweeping phenomenon is caused in a configuration in which a margin part 710, which follows the rear end part of the electrostatic latent image 400 in the sub-scanning direction, is small and the next electrostatic latent image 700 has a top end part following immediately behind the electrostatic latent image 400.

FIGS. 7A and 7B are similar to FIGS. 4A and 4B, respectively, except that there is the subsequent electrostatic latent image 700 in FIGS. 7A and 7B. The difference between FIGS. 7A to 7C and FIGS. 4A to 4C is illustrated in FIG. 7C, where the amount of toner 131a' is smaller than the amount of the toner 131a in FIG. 4C since the margin part 710 is small. This is a phenomenon where the margin part 710 with a small area causes charge dispersion at the top end part of the next electrostatic latent image 601 and the toner to be supplied to the rear end part 131b of the electrostatic latent image 400 is reduced. More specifically, the amount of toner excessively transferred due to sweeping becomes smaller when the margin part following the rear-end edge part is small in area than when the margin part is not small in area.

FIGS. 8A to 8C are for illustrating a problem arising from sweeping correction performed when a margin part following a rear-end edge part is small in area as mentioned above. FIGS. 8A to 8C are schematic diagrams showing an enlarged part of an image on the photosensitive drum 110. The size (number of lines) of a margin part of an image in a sub-scanning direction is not often uniform in a main-scanning direction. Hence, for a sweeping target region, a difference with respect to a margin part subsequent thereto sometimes varies depending on areas in the sweeping target region in the main scanning direction.

A sweeping target region is determined based on the above-explained difference in circumferential speed between the photosensitive drum 110 and the developing roller 150. Sweeping target regions have the same number of line 800 in the sub-scanning direction, as illustrated in FIGS. 8A to 8C.

As is seen from FIG. 8A, there is a margin part 710 with a small area (number of lines) in a position between the rear end part of the electrostatic latent image 400 and the top end part of the next electrostatic latent image 700 in the main-scanning direction. When sweeping correction processing is uniformly performed based on the number of sub-scanning lines 800 of the sweeping target region, appropriate correction is made on a region where the number of lines of the subsequent margin part is not smaller than the number of lines 800 of the sweeping target region. On the other hand, excessive correction is made on a region 810, where the number of lines of the subsequent margin part is smaller than the number of lines 800 of the sweeping target region, as illustrated in FIG. 8B. Accordingly, a correction to reduce the amount of exposure on the sweeping target region is made for the sweeping target region in anticipation of excessive transfer of toner due to the difference in rotational rate between the photosensitive drum 110 and the developing roller 150. However, if the area of the subsequent margin part is small, the toner is transferred in an amount lower than the anticipated level, as illustrated in FIG. 7C. In that case, the correction made to reduce the amount of exposure on the target region turns out to be excessive. With such an excessive correction, the toner consumption in the region 810 is suppressed more than necessary by pulse width modulation (PWM) and an image with deteriorated quality such as an image with voids is caused, as illustrated in FIG. 8C.

<<Sweeping Correction Processing Appropriate to Margin Part>>

Next, descriptions will be made of sweeping correction processing that takes account of a margin part, with reference to FIGS. 9 and 10. The procedure of operations in FIG. 9 is carried out by the CPU 210 according to a program stored in the ROM 220 or loaded into the RAM 240 in the controller 190. The processing in FIG. 9 to change the size (the number of lines in a sub-scanning direction) of a sweeping correction target region according to the number of lines in the sub-scanning direction of a margin part subsequent to a sweeping target region. In the following flowchart, the number of lines in the sub-scanning direction defining the sweeping target region determined based on the difference in the rotational rate between the photosensitive drum 110 and the developing roller 150 is called "specified line number". Further, the number of lines in the sub-scanning direction defining a region to be subjected to sweeping correction is called "processing target line number". While the "processing target line number" is equal to the "specified line number" when the margin part is not small in area, the "processing target line number" is not equal to the "specified line number" when the margin part is small in area. The processing will be described next of dividing the sweeping target region into a plurality of sub-regions in a main-scanning direction and determining the "processing target line number" for each sub-region.

In step S901, the controller 190 controls the image analyzing unit 252 in the image operation unit 250. The image analyzing unit 252 obtains, with reference to image data stored in an image memory, solid part information showing an electrostatic latent image region (hereinafter referred to as the "solid part") and margin part information showing a margin part, in a main-scanning direction. The information includes the number of adjacent pixels and position of change, for example. Note that the margin part used in the exemplary embodiment is not limited to be in pure white and may have a low density of toner not higher than a predetermined value.

Thereafter, in step S902, the image analyzing unit 252 further obtains solid part information and margin part information in a sub-scanning direction. The information includes the number of lines and position of change, for example.

Moreover, in step S903, the controller 190 divides the region of the solid part and the margin part into sub-regions in the main-scanning direction based on the margin part information in the main-scanning and sub-scanning directions, and sets the number of the sub-regions. The region is divided at a position where, in the main-scanning direction, the number of lines in the sub-scanning direction of the margin part (hereinafter referred to as the "margin part sub-scanning direction line number") changes. In the example of FIG. 8A, the region is divided into 3 sub-regions 1010, 1020, and 1030, as illustrated in FIG. 10.

In step S904, the controller 190 determines whether the margin part sub-scanning direction line number is smaller than the specified line number (15 to 30, for example) determined for the sweeping processing target region, for each of the sub-regions formed in the main-scanning direction. The processing proceeds to step S905 if the controller 190 has determined that the margin part line number is smaller than the specified line number (YES in step S904). On the other hand, the processing proceeds to step S906 if the controller 190 has determined that the margin part line number is not smaller than the specified line number (NO in step S904).

In step S905, the controller 190 sets the margin part sub-scanning direction line number as the sweeping correction processing target line number if the margin part sub-scanning direction line number is smaller than the specified line number. If sweeping correction is made based on the specified line number when the margin part sub-scanning direction line number is smaller than the specified line number, the toner consumption will be excessively reduced and solid-white will be generated. To deal with this problem, the margin part sub-scanning direction line number, not the specified line number, is set as the sweeping correction processing target line number when the margin part sub-scanning direction line number is smaller than the specified line number. The setting in this manner can prevent excessive reduction in toner consumption. While the margin part sub-scanning direction line number is set as the sweeping correction processing target line number in the exemplary embodiment, this manner of setting is not the only one applicable to the present invention and any other manners may be employed as long as they can prevent excessive reduction in toner consumption. For example, the controller 190 may set, as the sweeping correction processing target line number, the number of lines smaller than the specified line number in step S904.

In contrast, when the margin part sub-scanning direction line number is not smaller than the specified line number of the sweeping processing target region, the controller 190 sets the specified line number as the sweeping correction processing target line number in step S906.

In step S907, the controller 190 determines whether the processing in steps S904 to S906 has been performed on all of the sub-regions formed in the main-scanning direction, and returns to step S904 to repeat the processing in steps S904 to S906 if it has determined that the processing has not been performed on all of the sub-regions (NO in step S907).

Figure 10:
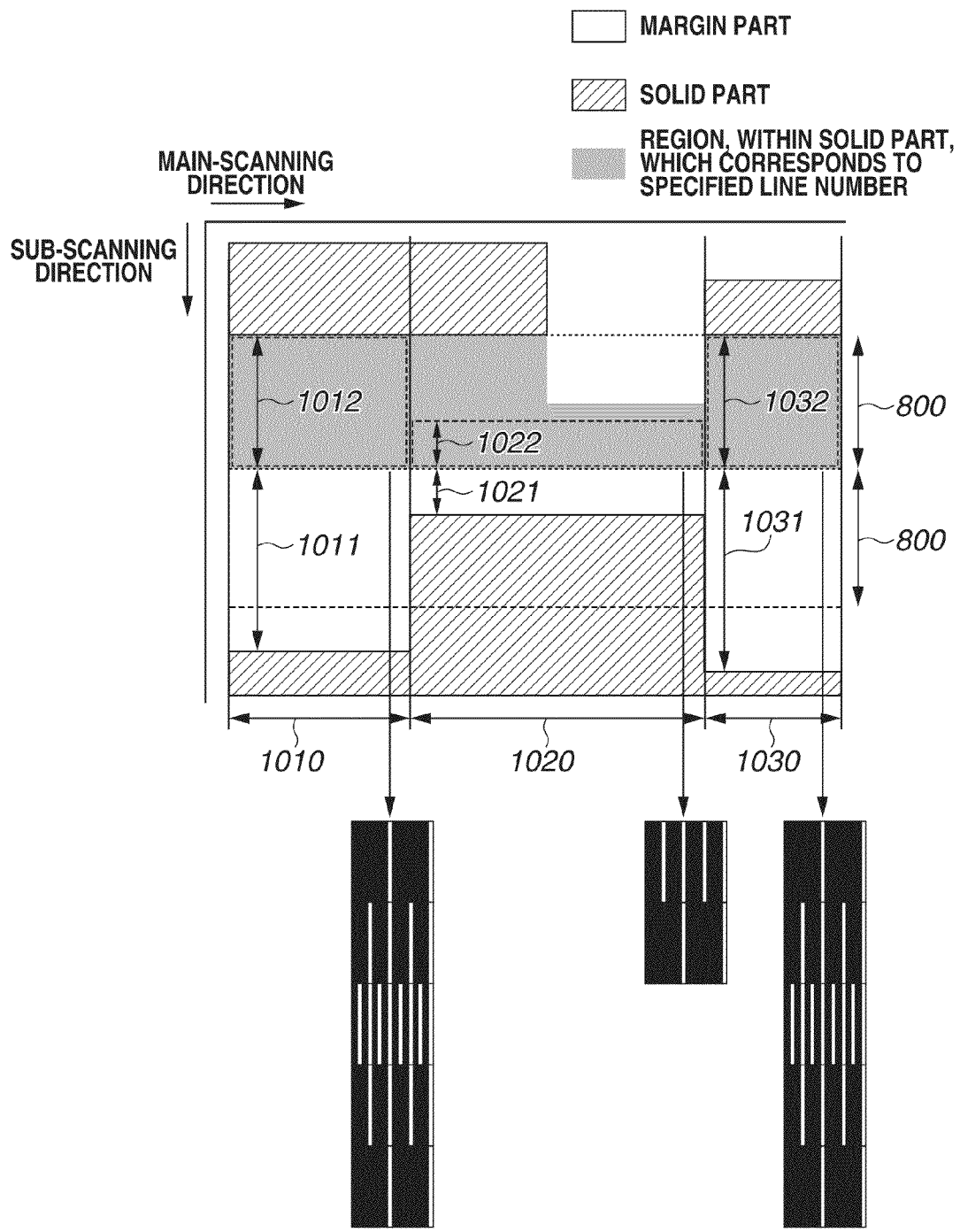
FIG. 10 is a diagram illustrating a specific example of sweeping correction in the first exemplary embodiment.

FIG. 10 is for illustrating how the number of lines of the sweeping correction target region is determined. FIG. 10 corresponds to FIGS. 8A to 8C. FIGS. 8A to 8C and 10 illustrate the similar electrostatic latent image part and margin part, except that the gray region in FIG. 10 defines a region in which, within the solid part, the number of lines corresponds to the specified number of lines. In FIG. 10, the numbers of lines are specified by reference numbers. Accordingly, note that numbers appearing after the numbers of lines in the sentences of the specification are merely reference numbers and do not indicate actual numbers of lines. As described in the flowchart of FIG. 9, the controller 190 divides the region into sub-regions 1010, 1020, and 1030 in the main-scanning direction based on the solid part information and the margin part information.

After that, the controller 190 repeats the processing in steps S904 to S906 in FIG. 9 for each sub-region. The controller 190 compares, for the sub-region 1010, the specified line number 800 and a sub-scanning direction line number 1011 of the margin part behind the solid part in the sub-scanning direction. Since the margin part line number 1011 is larger than the specified line number 800, the controller 190 sets the specified line number 800 as a sweeping correction processing target line number 1012 for the sub-region 1010, as shown in step S906.

Subsequently, the controller 190 compares, for the sub-region 1020, the specified line number 800 and a sub-scanning direction line number 1021 of the margin part behind the solid part in the sub-scanning direction. Since the sub-scanning direction margin part line number 1021 is smaller than the specified line number 800 as in FIG. 10, the controller 190 sets the margin part line number 1021, not the specified line number 800, as a sweeping correction processing target line number 1022, as shown in step S905.

The controller 190 thereafter compares, for the sub-region 1030, the specified line number 800 and a sub-scanning direction line number 1031 of the margin part behind the solid part in the sub-scanning direction. Since the margin part line number 1031 is larger than the specified line number 800, the controller 190 sets the specified line number 800 as a sweeping correction processing target line number 1032, as shown in step S906.

When analysis by the image analyzing unit 252 has been performed and the sweeping correction processing target line number has been thus set based on the analysis, the image analyzing unit 252 notifies the parameter setting unit 251 of the sweeping correction processing target line number. The parameter setting unit 251 sets for each sub-region an exposure correction parameter appropriate to the processing target line number, with reference to the LUT 242. From FIG. 10, it is also found that exposure correction parameters appropriate to the processing target line numbers are set for the sub-regions. The exposure control unit 253 outputs driving signals based on the thus set exposure correction parameters so that pulse width modulation will be performed and the exposure amount will be corrected. This is how sweeping correction is performed.

As described above, in this exemplary embodiment, the sweeping correction processing target line number is determined based on the specified line number and the margin part sub-scanning direction line number. This allows appropriate setting of the correction target line number in the sub-scanning direction and proper reduction of toner consumption. Moreover, this also achieves prevention of degradation in image quality such as generation of solid-white caused by the reduction processing of toner consumption.

In the first exemplary embodiment, the margin part sub-scanning direction line number is considered in determining the sweeping correction processing target line number. In a second exemplary embodiment, the solid part sub-scanning direction line number, in addition to the margin part sub-scanning direction line number, will be considered in determining the sweeping correction processing target line number. More specifically, the second exemplary embodiment is an example in which the sub-scanning direction line number of the solid part and the sub-scanning direction line number of the margin part are factors determining the sweeping correction processing target line number, the solid part being a region where a latent image is to be formed and the margin part being immediately behind the solid part in the sub-scanning direction.

Figure 11:
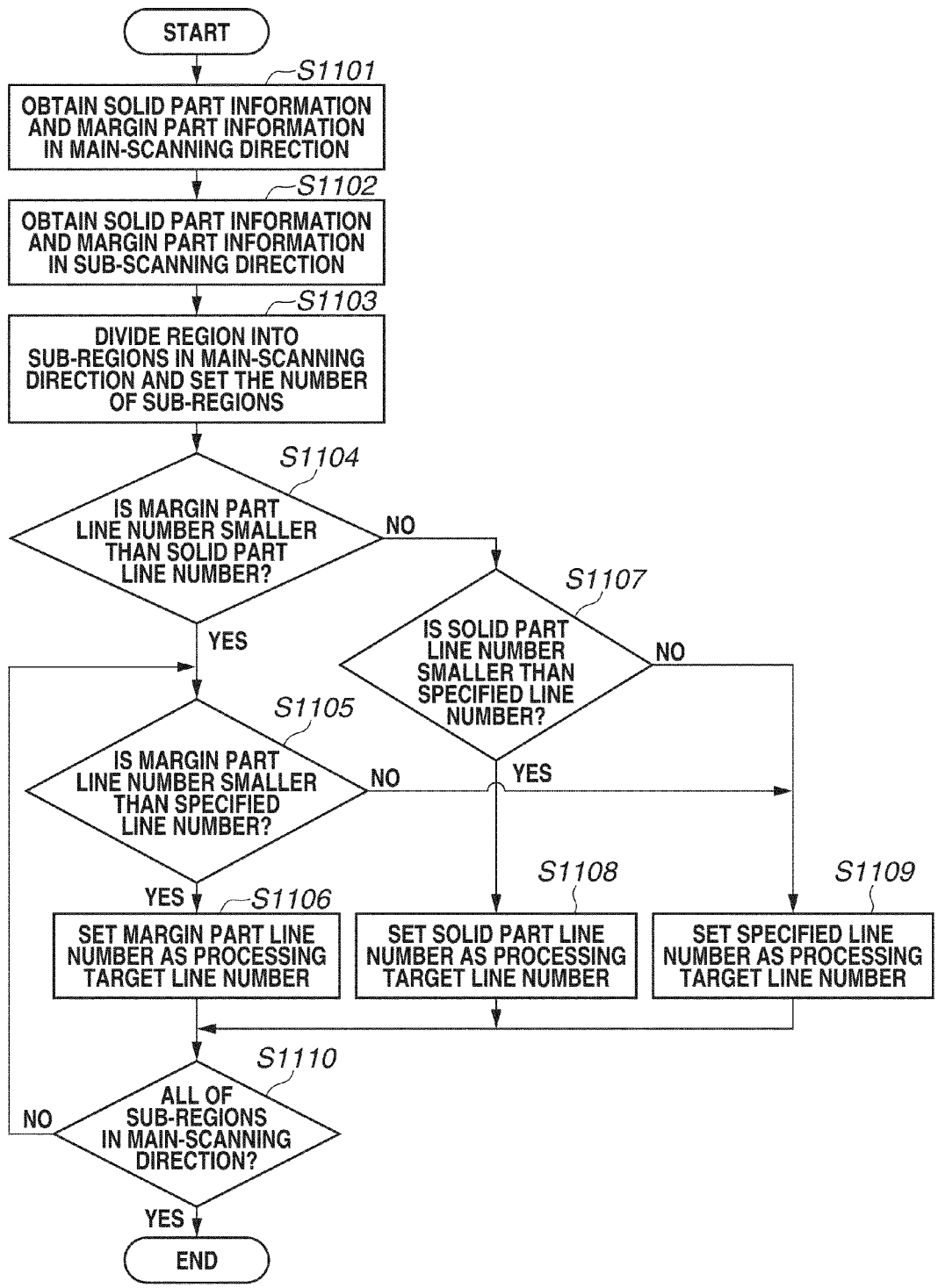
FIG. 11 is a flowchart representing processes for determining a sweeping correction processing target line in a second exemplary embodiment.

FIG. 11 is a flowchart illustrating the operations of determining the sweeping correction target line number, with the sub-scanning direction line number of the margin part and the sub-scanning direction line number of the solid part taken into account. The processing in steps S1101 and S1102 is similar to the processing in steps S901 and S902 in FIG. 9 and will not therefore be described.

Figure 12:
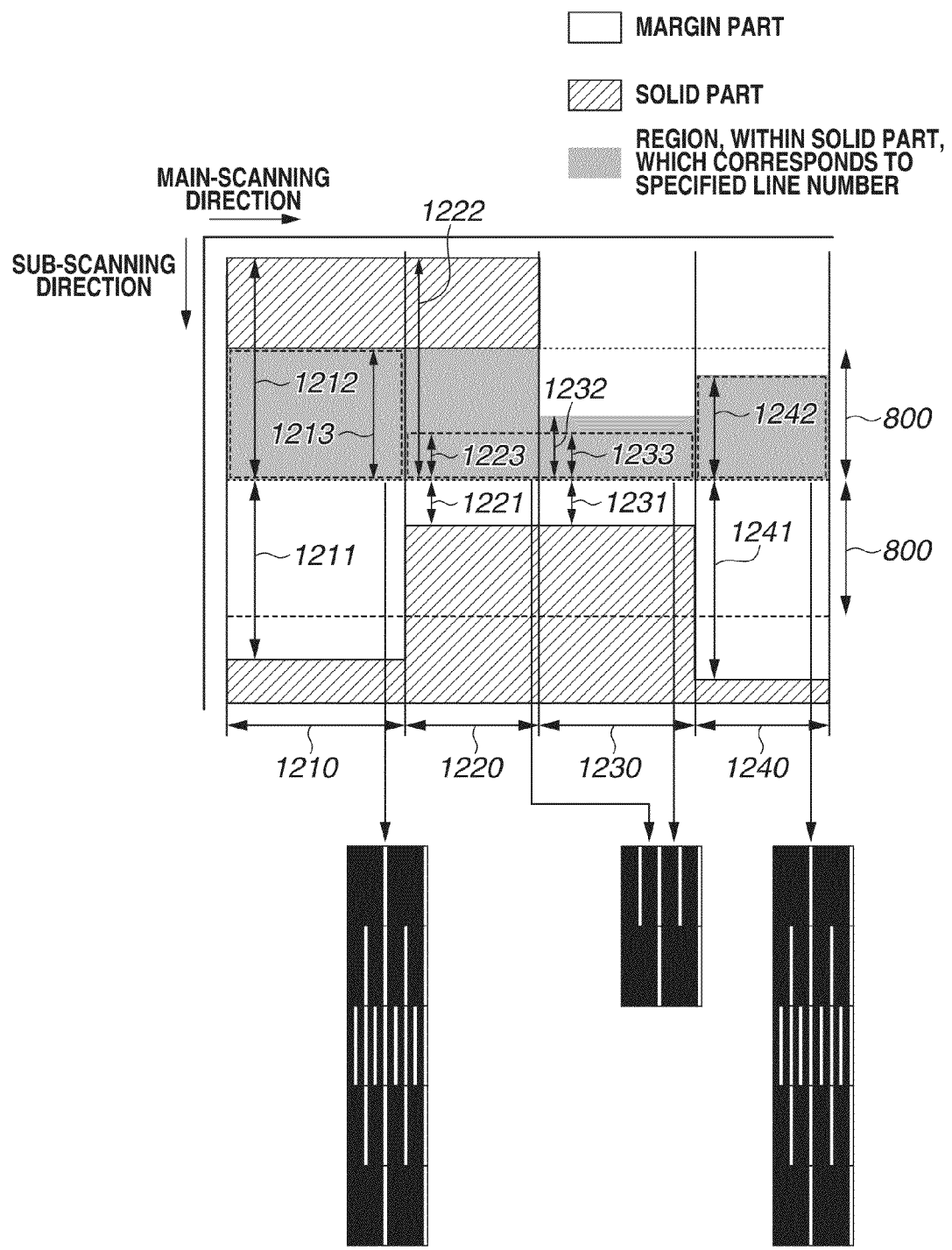
FIG. 12 is a diagram illustrating a specific example of sweeping correction in the second exemplary embodiment.

In step S1103, the controller 190 divides a region into sub-regions in a main-scanning direction based on margin part information and solid part information in the main-scanning and margin part information and solid part information in a sub-scanning direction, and sets the number of the sub-regions. The region is divided at a position where, in the main-scanning direction, a sub-scanning direction line number of the margin part or the solid part changes, for example. The region is divided into 4 sub-regions, as illustrated in FIG. 12, in the example of FIG. 12. In the exemplary embodiment, the region is divided even at a position where, in addition to a position where the number of lines of the margin part changes, the number of lines of the solid part changes in the main direction.

In step S1104, the controller 190 determines whether the margin part sub-scanning direction line number is smaller than the solid part sub-scanning direction line number, for each of the sub-regions formed in the main-scanning direction. The processing proceeds to step S1105 if the controller 190 has determined that the sub-scanning direction line number of the margin part is smaller than that of the solid part (YES in step S1104). On the other hand, the processing proceeds to step S1107 if the controller 190 has determined that the sub-scanning direction line number of the margin part is not smaller than that of the solid part (NO in step S1104).

The processing from steps S1105 to S1106 or the processing from step 1105 to step S1109 performed when the sub-scanning direction line number of the margin part is smaller than that of the solid part is similar to the processing from step S904 to step S905 or the processing from step S904 to step S906 in FIG. 9. That is, the controller 190 in step S1105 determines whether the margin part sub-scanning direction line number is smaller than the specified line number determined for the sweeping processing target region. The controller 190 in step S1106 sets the margin part sub-scanning direction line number as the sweeping correction processing target line number if it has determined that the margin part sub-scanning direction line number is smaller than the specified line number. On the other hand, the controller 190 in step S1109 sets the specified line number as the sweeping correction processing target line number if it has determined that the margin part sub-scanning direction line number is not smaller than the specified line number. In this way, when the sub-scanning direction line number of the margin part is not larger than that of the solid part, the similar processing to that in the first exemplary embodiment is performed without taking account of the line number of the solid part.

When the controller 190 has determined in step S1104 that the sub-scanning direction line number of the margin part is not smaller than that of the solid part, on the other hand, the line number of the solid part is considered in the processing. This is because the margin part being larger than the solid part indicates the possibility that excessive sweeping correction may be made on the solid part. In step S1107, the controller 190 determines whether the solid part line number in the sub-scanning direction is smaller than the specified line number determined for the sweeping processing target region when the sub-scanning direction line number of the margin part is not smaller than that of the solid part. The processing proceeds to step S1108 if the controller 190 has determined that the solid part line number in the sub-scanning direction is smaller than the specified line number (YES in step S1107), and proceeds to step S1109 if the controller 190 has determined that the solid part line number in the sub-scanning direction is not smaller than the specified line number (NO in step S1107).

In step S1108, the controller 190 sets the solid part sub-scanning direction line number as the sweeping correction processing target line number when the solid part sub-scanning direction line number is smaller than the specified line number determined for the sweeping processing target region. If sweeping correction is made on the region based on the specified line number under the condition that the solid part sub-scanning direction line number is smaller than the specified line number, voids can be generated after all. To deal with this problem, the solid part sub-scanning direction line number is set as the line number of the processing target. The setting in this manner makes the sweeping correction processing on the solid part more appropriate. Since the LUT 242 also includes exposure correction parameters for a case where the processing target line number is not larger than the specified line number, appropriate sweeping correction is possible as well even when the number of lines being subjected to the processing is set to be smaller than the specified line number.

The controller 190 in step S1109 sets the specified line number as the sweeping correction processing target line number if the solid part line number is not smaller than the specified line number determined for the sweeping processing target region.

In step S1110, the controller 190 determines whether the processing in steps S1104 to S1109 has been performed on all of the sub-regions formed in the main-scanning direction, and returns to step S1104 to repeat the processing if it has determined that the processing has not been performed on all of the sub-regions (NO in step S1110).

FIG. 12 is for illustrating how the sweeping correction target line number is determined. As described in the flowchart of FIG. 11, the controller 190 divides the region into sub-regions 1210, 1220, 1230, and 1240 in the main-scanning direction based on the solid part information and the margin part information.

After that, the controller 190 compares, for the sub-region 1210, a margin part sub-scanning direction line number 1211 and a solid part sub-scanning direction line number 1212. Since the margin part line number 1211 is smaller than the solid part line number 1212 and is larger than the specified line number 800 in FIG. 12, the controller 190 sets the specified line number 800 as a sweeping correction processing target line number 1213.

Subsequently, the controller 190 compares, for the sub-region 1220, a margin part sub-scanning direction line number 1221 and a solid part sub-scanning direction line number 1222. Since the margin part line number 1221 is smaller than the solid part line number 1222 and is smaller than the specified line number 800, the controller 190 sets the margin part line number 1221 as a sweeping correction processing target line number 1223.

The controller 190 thereafter compares, for the sub-region 1230, a margin part sub-scanning direction line number 1231 and a solid part sub-scanning direction line number 1232. Since the margin part line number 1231 is smaller than the solid part line number 1232 and is smaller than the specified line number 800, the controller 190 sets the margin part line number 1231 as a sweeping correction processing target line number 1233.

The controller 190 further compares, for the sub-region 1240, a margin part sub-scanning direction line number 1241 and a solid part sub-scanning direction line number 1242. Since the margin part line number 1241 is larger than the solid part sub-scanning direction line number 1242 and the solid part sub-scanning direction line number 1242 is smaller than the specified line number 800, the controller 190 sets the solid part line number 1242 as a sweeping correction processing target line number.

As described above, in this exemplary embodiment, the sweeping correction processing target line number is determined based on the solid part and margin part sub-scanning direction line numbers. This allows appropriate setting of the correction target line number in the sub-scanning direction and proper reduction of toner consumption. Moreover, this also achieves prevention of degradation in image quality such as generation of solid-white in the reduction processing of toner consumption.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-222649, filed Oct. 31, 2014, which is hereby incorporated by reference herein in its entirety.

What is claimed is:

1. An image forming apparatus comprising:
an obtaining unit configured to obtain a number of pixels in a sub-scanning direction of a white region in image data, the white region being adjacent to a region at a downstream side in the sub-scanning direction of the region and the region being in the image data and including, continuously in the sub-scanning direction, pixels with a density not smaller than a predetermined density; and
a correcting unit configured to correct a pixel value for a unit region based on the number of pixels of the white region obtained by the obtaining unit so that a density of the unit region becomes low, the unit region being included in the region at the downstream side thereof in the sub-scanning direction,
wherein the correction unit corrects the density of the unit region with a first correction amount in a case where the number of pixels of the white region obtained by the obtaining unit is a first number of pixels, and corrects the density of the unit region with a second correction amount larger than the first correction amount in a case where the number of pixels of the white region obtained by the obtaining unit is a second number of pixels which is larger than the first number of pixels.

2. The image forming apparatus according to claim 1, wherein the correction of the pixel value for the unit region made by the correction unit is processing of correcting a part of a plurality of black pixels of the unit region into white pixels.

3. The image forming apparatus according to claim 1, wherein the white region has a density of which a level is not higher than a predetermined level.

4. The image forming apparatus according to claim 1, wherein the white region is located between the region and a region, located downstream the region in the sub-scanning direction, in which pixels with a density not lower than the predetermined density is included continuously in the sub-scanning direction.

5. An image forming apparatus configured to perform correction of an excessive transfer of toner to a rear end, in a rotational direction, of a latent image part on a photosensitive drum, the image forming apparatus comprising:
an obtaining unit configured to obtain information indicating a specified number of lines in a sub-scanning direction of a region to which the correction is to be made;
a division unit configured to divide a first solid part in a main-scanning direction based on a number of lines in the sub-scanning direction of a margin part, the margin part being located between the first solid part and a second solid part, the first solid part being a region where a latent image is to be formed, and the second solid part being a region located behind the first solid part in the sub-scanning direction and in which another latent image is to be formed; and
a setting unit configured to set a number of lines which are, in the sub-scanning direction in a divided region made by the division unit, subjected to the correction, based on the number of the lines of the margin part located behind the divided region in the sub-scanning direction.

6. The image forming apparatus according to claim 5, wherein, in a case where the number of the lines of the margin part located behind the divided region in the sub-scanning direction is smaller than the specified number of lines shown in the information obtained by the obtaining unit, the setting unit sets a number smaller than the specified number of lines shown in the information obtained by the obtaining unit as the number of the lines which are subjected to the correction in the sub-scanning direction in the divided region.

7. The image forming apparatus according to claim 6, wherein the setting unit sets the number of the lines of the margin part located behind the divided region in the sub-scanning direction as the number of the lines which are subjected to the correction in the sub-scanning direction in the divided region.

8. The image forming apparatus according to claim 5, wherein, in a case where a number of lines of a margin part corresponding to the divided region is not smaller than the specified number of lines shown in the information obtained by the obtaining unit, the setting unit sets the specified number of lines shown in the information obtained by the obtaining unit as the number of the lines which are subjected to the correction in the sub-scanning direction in the divided region.

9. The image forming apparatus according to claim 5, wherein the division unit divides the divided region in the main scanning direction further based on a number of lines of the first solid part in the sub-scanning direction, and the setting unit sets a number of lines which are subjected to the correction, in the sub-scanning direction in a sub-region made by the division of the divided region by the division unit, based on a number of lines in the sub-scanning direction of the sub-region and a number of lines of a margin part located behind the sub-region in the sub-scanning direction.

10. The image forming apparatus according to claim 9, wherein, in a case where the number of the lines of the margin part located behind the sub-region in the sub-scanning direction is smaller than the number of the lines in the sub-scanning direction of the sub-region and is smaller than the specified number of lines shown in the information obtained by the obtaining unit, the setting unit sets a number smaller than the specified number of lines shown in the information obtained by the obtaining unit as the number of the lines which are subjected to the correction in the sub-scanning direction in the sub-region.

11. The image forming apparatus according to claim 10, wherein the setting unit sets the number of the lines of the margin part located behind the sub-region in the sub-scanning direction as the number of the lines which are subjected to the correction, in the sub-scanning direction in the sub-region.

12. The image forming apparatus according to claim 9, wherein, in a case where the number of the lines of the margin part located behind the sub-region in the sub-scanning direction is smaller than the number of the lines in the sub-scanning direction of the sub-region and a number of lines of a margin part corresponding to the sub-region is not smaller than the specified number of lines, the setting unit sets the specified number of lines shown in the information obtained by the obtaining unit as the number of the lines which are subjected to the correction in the sub-scanning direction in the sub-region.

13. The image forming apparatus according to claim 9, wherein, in a case where the number of the lines of the margin part located behind the sub-region in the sub-scanning direction is not smaller than the number of the lines in the sub-scanning direction of the sub-region and the number of the lines in the sub-scanning direction of the sub-region is smaller than the specified number of lines shown in the information obtained by the obtaining unit, the setting unit sets the number of the lines in the sub-scanning direction of the sub-region as the number of the lines which are subjected to the correction in the sub-scanning direction in the sub-region.

14. The image forming apparatus according to claim 9, wherein, in a case where the number of the lines of the margin part located behind the sub-region in the sub-scanning direction is not smaller than the number of the lines in the sub-scanning direction of the sub-region and the number of the lines in the sub-scanning direction of the sub-region is not smaller than the specified number of lines shown in the information obtained by the obtaining unit, the setting unit sets the specified number of lines shown in the information obtained by the obtaining unit as the number of the lines which are subjected to the correction, in the sub-scanning direction in the divided region.

15. The image forming apparatus according to claim 5, wherein the obtaining unit obtains the specified number of lines based on a difference in the rate of rotation between the photosensitive drum and a developing roller supplying toner to the photosensitive drum.

16. The image forming apparatus according to claim 5, further comprising a control unit configured to control exposure by an exposure unit, using a parameter appropriate to the number of lines in the sub-scanning direction set by the setting unit.

17. The image forming apparatus according to claim 16, wherein the control unit obtains an exposure correction amount corresponding to the number of lines in the sub-scanning direction set by the setting unit based on a table in which the number of lines in the sub-scanning direction and a corresponding exposure correction amount are associated with each other, and performs control by pulse-width modulating a signal driving the exposure unit based on the obtained exposure correction amount.

18. An image forming method comprising:
obtaining a number of pixels in a sub-scanning direction of a white region in image data, the white region being adjacent to a region at a downstream side in the sub-scanning direction of the region and the region being in the image data and including, continuously in the sub-scanning direction, pixels with a density not smaller than a predetermined density; and
correcting a pixel value for a unit region based on the number of pixels of the white region obtained by the obtaining so that a density of the unit region becomes low, the unit region being included in the region at the downstream side thereof in the sub-scanning direction,
wherein the correcting corrects the density of the unit region with a first correction amount in a case where the number of pixels of the white region obtained by the obtaining is a first number of pixels, and corrects the density of the unit region with a second correction amount larger than the first correction amount in a case where the number of pixels of the white region obtained by the obtaining is a second number of pixels which is larger than the first number of pixels.

19. An image forming apparatus configured to perform correction of an excessive transfer of toner to a rear end, in a rotational direction, of a latent image part on a photosensitive drum, the image forming apparatus comprising a setting unit configured to set a number of lines which are subjected to the correction, in a sub-scanning direction in a solid part, according to a number of lines in the sub-scanning direction of a margin part located adjacent to a rear end, in the sub-scanning direction, of the solid part in the sub-scanning direction, the solid part being a region where a latent image is to be formed.

* * * * *